Figure 1:
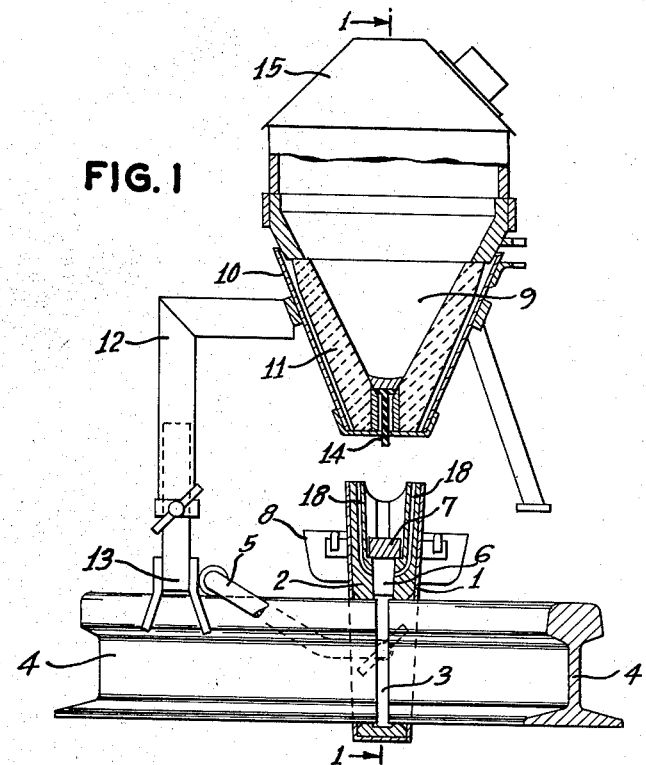

June 22, 1965 W. AHLERT ETAL 3,189,959
ALUMINOTHERMIC WELDING OF RAILS
Filed Dec. 27, 1963 2 Sheets-Sheet 1

INVENTORS
WILHELM AHLERT
ERNST KRÜGER
BY
James E. Bryan
ATTORNEY

June 22, 1965   W. AHLERT ETAL   3,189,959
ALUMINOTHERMIC WELDING OF RAILS
Filed Dec. 27, 1963   2 Sheets-Sheet 2

INVENTORS
WILHELM AHLERT
ERNST KRÜGER
BY
ATTORNEY 3,189,959
ALUMINOTHERMIC WELDING OF RAILS
Wilhelm Ahlert and Ernst Krüger, Essen, Germany, assignors to Elektro-Thermit G.m.b.H., Essen, Germany, a corporation of Germany
Filed Dec. 27, 1963, Ser. No. 335,460
Claims priority, application Germany, Oct. 8, 1963, E 25,641
4 Claims. (Cl. 22—204)

This invention relates to a method and apparatus for the aluminothermic welding of rails in which the rail ends to be welded are heated to the welding temperature by heat-transfer from aluminothermically produced steel and then welded together over the entire ends of the rails, a gap between the rails being filled with the molten steel.

Several methods for the aluminothermic welding of rails are known in which welding may be effected without preheating prior to the casting process. In one process, rail ends which have been machined parallel to each other are pressed together and enclosed within a casting mold. The rail ends are then heated by the molten aluminothermic reaction products, i.e., iron and slag, which are cast about the rail ends, and the rails are pressure-welded over the entire cross-section or ends thereof.

In another known method, only the rail webs or rail bases having a gap between them, are fused by the casting of aluminothermically produced iron and the rail heads, heated by slag, are pressure-welded.

As a result of the development of an aluminothermic material having the same resistance to wear as rail steel, the aforementioned methods are now obsolete and have been replaced by the intermediate casting process in which the rail ends are fused with each other and united over the entire cross-section thereof by intermediate casting. In one such method, the rail ends to be welded are placed with a gap or space between them and enclosed in a casting box consisting of two mold halves. This casting box or welding unit, which is made from synthetic resin-bonded sand, is a combination reaction crucible and casting mold. The reaction chamber, in the upper portion of this unit, is provided, above the gap between the rails to be welded, with an outlet or discharge opening which corresponds to the width of the rail head and which is closed by several small metal plugs. The casting mold portion of this combination has channels or ducts in the lower part thereof which connect the hollow chamber or cavity of the casting mold at the outer edges of the rail bases with a collecting chamber which is disposed in the lowermost portion of the mold. When this unit has been secured in place about the rail ends and the discharge openings of the reaction chamber have been plugged, the aluminothermic material is poured in and ignited. The steel, which collects in the lower portion of the reaction chamber, automatically melts the small closure plugs, flows into the interstice or gap between the rails and then through the channels into the lower collecting chamber until the collecting chamber, the channels and the intermediate casting gap have been filled. The channels or ducts extending from the intermediate casting cavity to the collecting chamber are dimensioned such that more steel flows in from the reaction chamber than is discharged into the collecting chamber.

It has been found, however, that welds made according to the above-described method are not uniformly able to withstand operational stresses and the method is also subject to certain disadvantages in constructional techniques. Thus, for example, the reaction chamber, the walls of which are made of sand, exerts an unfavorable metallurgical action on the welding material, as a result of the high temperatures attained in the aluminothermic reaction, and the steel absorbs silicon from the walls of the mold to an undesirable extent. Moreover, the danger exists that, during the pouring of the steel, the air enclosed in the casting mold cavities, particularly in the collecting chamber, can not completely escape even where a porous mold is used and this causes defects, such as pores, in the welded material. Also, the so-called automatic tapping, which occurs after melting of the small metal plugs covering the discharge opening, is unsuitable for practical purposes because the time of tapping depends on the progress of the aluminothermic reaction and should instead be determined in accordance with the individual reactions, which generally vary with regard to their progress. In the prior art method, the time at which the steel flows into the mold depends only upon the number of small metal plugs which are melted and not, as is desired, on the degree of uniformity of the melt which must be visually judged.

The result is an inevitable variation in the quality of the welds, imperfectly welded joints, and other deficiencies. Also, the steel in a defectively welded portion, the defects of which may be recognized during the progress of the aluminothermic reaction, can not be prevented from flowing into the mold so the weld must be cut out, which is time-consuming and expensive. Further, once these molds have been attached to the rail ends to be welded, it is impossible to effect preheating of the rail ends by means of preheating burners, which may be necessary where very cold rails are to be welded in winter, or where the rails are wet, because there are no discharge or exhaust conduits for the combustion gases and, also, the molds lose strength and stability as the binder is burned, with the result that the sand is loosened and runs off. Further, it is impossible to make welds on ties or double ties with this welding unit since there is no room for attaching the mold, including the collecting chamber positioned below the rail bases, between the rail and the tie. Also, the mold bodies are difficult to manufacture and are extremely bulky and, since the units must generally be shipped over long distances, packing difficulties are entailed as well as high packing and loading costs and expenses for transportation thereof.

The present invention relates to a method for the aluminothermic welding of rails in which the rail ends are positioned with an interstice or gap between them and are heated to the welding temperature exclusively by the heat of aluminothermically produced steel. The rails are fused and united with each other over the entire cross-section thereof; the process of the present invention effectively avoids the aforementioned disadvantages and drawbacks and will produce welds which respond to the practical and operational stresses with a higher degree of safety than those previously known, while also being more economically produced.

The present invention is distinguished by the following: the molten steel required for welding is not produced, as in known methods, in a reaction crucible which is fabricated from molding sand and which forms one integral unit with the casting mold proper and is used only once. Instead, the molten steel is formed in a casting or molding crucible which is separate from the casting mold, and which may be repeatedly reused, and which also is fabricated from material inert to the aluminothermic reaction.

Further, in the method of the present invention, casting molds are preferably employed which are made from pure quartz sand, using a water glass-containing binder with an addition of silicon oil, and which are hardened according to the $CO_2$ hardening process. These molds are self-ventilating as they have a high degree of porosity and are inert to atmospheric influences. Also, the mold bodies of the present invention can be easily and inexpensively fabricated, and the dimensions thereof can be maintained small, which is a desirable feature insofar as the expense of making the molds is concerned, as well as the expenses for packing and transportation. Further, since the molds are fireproof they are unaffected by the action of flames during preliminary heating of the rail ends, which may in some cases be necessary while the molds are attached to the rail ends, and, thus, such preheating causes no difficulties.

A further feature of the present invention resides in the particular manner in which the casting steel is poured into the mold. In the known methods, the steel flows into the intermediate casting cavity over the entire width of the rail head and from there partially into the collecting chamber which is disposed below the rail bases. In the present method, however, the steel flows into the casting mold cavity on both sides of the upper curvatures of the rail heads, then downwardly past the lower edges of the rail heads, then angularly towards the approximate center of the rail webs, and then to the rail bases. As a result, the first portion of the steel poured into the mold, which is utilized for preheating and partial fusion of the rail ends, is collected in riser channels of the mold which are provided above the outer edges of the rail bases and the air present in the intermediate casting cavity above the rail heads is discharged to the atmosphere through ventilating ducts.

The casting mold of the present invention includes two mold halves and a bar inserted from above into the main riser channel of the mold, which is positioned transversely above the rail heads. This bar covers the welding gap and serves as an impact and distributor surface when the steel is poured into the mold. Each half of the mold includes a gate, each of which extends approximately vertically into the mold to a point above the upper curvature of the rail heads, then continues on the side of the mold laterally and downwardly past the rail heads to the lower edges of the rail heads, then in an angular manner to the approximate center of the web, and then becoming a recess enclosing the rail profile, with the exception of the rail base.

The casting mold also includes risers extending upwardly into the mold cavity above the outer edges of the rail bases and which serve to receive the steel which first flows into the mold and is, accordingly, utilized for pre-heating and preliminary fusion by heat conduction. The casting mold also includes ventilating ducts connecting the primary riser channel with the exterior of the mold.

In performing the method of the present invention, the two halves of the casting mold are inserted into a mold-supporting housing and secured against the rail ends to be welded, having a gap therebetween, by means of a clamping device secured to a rail head; the two halves are sealed against the rails by the use of an appropriate molding compound. A bar is then placed into the main riser channel of the mold and slag pans are attached to one or both of the mold-supporting housing plates. The casting crucible is then inserted into a crucible holder or support, the tubular end of which is locked into a socket on the clamping device. After plugging the discharge opening in the crucible, an aluminothermic welding compound is poured into the crucible which is then covered by a cap.

The casting crucible includes a sheet metal casing having therein a conically shaped, highly refractory, prefabricated lining which is inert to the aluminothermic reaction. The crucible is provided with a discharge opening in the lower portion thereof which is closed prior to pouring in the aluminothermic compound which provides the welding material. After the aluminothermic reaction is completed, the crucible is tapped by forcing a tapping pin upwardly so that the contents of the crucible can then run out. The lining, which is adapted to withstand a plurality of reactions, is preferably fabricated from magnesite and may be easily replaced when it has become excessively worn.

Figure 2:
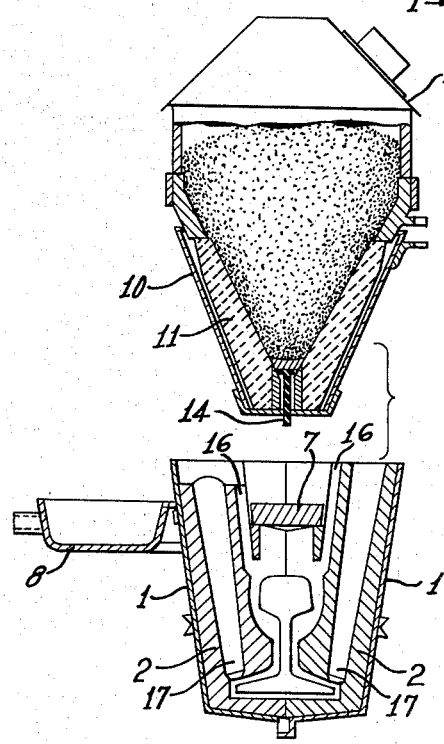
Figure 3:
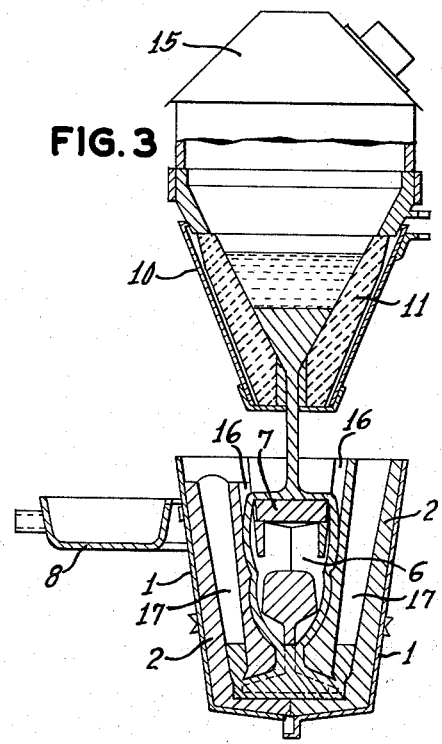
Figure 4:
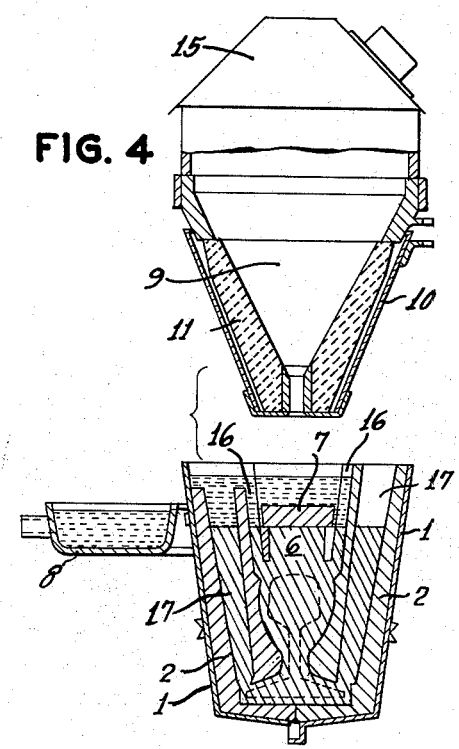
Figure 5:
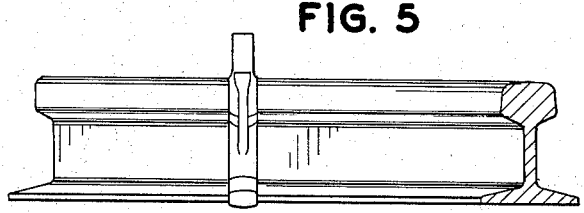
Figure 6:
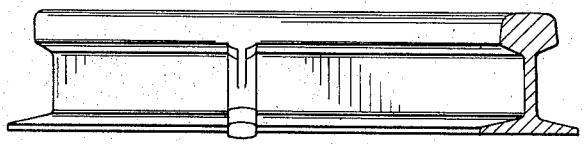

The invention will be further illustrated by reference to the accompanying drawings in which:

FIGURE 1 is a sectional view in elevation through the empty casting crucible of the invention showing the crucible support means and the clamping device as well as one casting mold half to be attached to the rail ends, together with the bar and the slag pan, FIGURE 2 is a sectional view taken on line 1—1 of FIGURE 1 showing the crucible filled with aluminothermic material and after the attachment of both casting mold halves, the clamping device being deleted, FIGURE 3 is a sectional view similar to FIGURE 2 showing the assembly after tapping of the crucible has been effected and with the casting mold cavities partially filled, FIGURE 4 is a sectional view similar to FIGURE 3 showing the apparatus after completion of the casting operation, FIGURE 5 shows the finished rough weld after removal of the mold, and FIGURE 6 shows the finished, machined weld.

In the method of the present invention, the prefabricated mold halves 2, which are inserted in the mold-supporting plates or housing 1, are attached as shown in the drawings to the rail ends 4 to be welded, the latter being placed with a space or gap 3 between them. The casting mold halves 2 are forced against the rail ends by means of the clamping device 5 and are sealed against the rails by the use of an appropriate molding compound. Then, the bar 7, which closes off the top or main riser channel 6, is placed in position in the mold and a slag pan 8 is connected to the mold housing plate 1. The casting crucible 9, including the crucible casing 10 and the refractory lining 11, is inserted into the crucible holder 12, the tubular end of which is secured to the socket 13 of the clamping device 5, the latter being secured to the rail head.

The outlet opening of the crucible is then closed by the tapping pin or peg 14, which is insulated to prevent premature melting. The aluminothermic molding compound is then poured into the crucible and the top thereof is covered with the cap 15, having an opening therein. Following alignment of the crucible over the mold, the aluminothermic reaction is commenced in known manner and, after the reaction is completed in accordance with conventional procedure, the crucible is tapped by forcing the tapping pin or peg 14 upwardly.

The steel which has collected at the bottom of the crucible and which will thus first run out, impinges on the bar 7 inserted into the mold and from there flows through the two gates 16. The steel flowing into the casting gap is cooled by conduction while flowing past the rail ends, with the result that the rail ends are partially melted, and this steel collects in the bottom risers 17 disposed above the outer edges of the rail bases in the mold. The air present in the casting cavity escapes, as the steel rises, through the ventilating ducts 18, shown in FIGURE 1, which extend from the head or main riser channel below the inserted bar 7 to the exterior of the mold. The slag, which runs out after the steel, runs over the mold, which is already filled with steel, into the slag pan 8 where it is solidified.

Only one or two minutes after the completion of the casting operation, the mold may be removed and the bottom risers, gates and main riser may be removed either manually or mechanically with a pneumatic clipper. The finishing treatment of the rail end is performed after cooling of the weld, preferably by grinding. The casting crucible used in the welding operation is then ready for immediate re-use.

Since the present invention employs a casting crucible which is separate from the casting mold and since the tapping thereof is controlled, it is ensured that the molten steel will be poured into the casing mold as a balanced melt after the required metallurgical equilibrium is attained and which may be visually judged; the steel will not flow into the casting gap prematurely. This guarantee of a uniform balanced melt, together with the use of a casting crucible which includes a lining inert to the aluminothermic reaction, renders it possible to produce a welding material corresponding to the composition of the portion to be welded and which has a uniform quality. These considerations considerably increase the safety of the welds.

Additional desirable factors are the particular manner of pouring the steel in the casting operation, using the self-ventilating casting mold and the additional ventilation of the casting mold cavity provided by the ventilating ducts connecting the top riser channel to the exterior of the mold. Because the heat is supplied in accordance with the rail profile, the particular manner of pouring the steel in the casting operation results in a uniform melting of the rail cross-sections to be welded, which has a favorable effect upon the physical properties of the weld. The casting mold of the present invention also may be used for welding on ties and double ties since the volume of the mold below the rail bases is small. Further, the utilization of smaller refractory casting molds, which are easy to make and have a separate casting crucible having a lining which will withstand a plurality of aluminothermic reactions and is easily replaced, has not only technical but economical advantages, since the manufacturing costs of the crucible and mold, as well as packing and shipping costs, are low.

It will be obvious to those skilled in the art that many modifications may be made within the scope of the present invention without departing from the spirit thereof, and the invention includes all such modifications.

What is claimed is:

1. A method for the aluminothermic welding of rail ends in which the welding temperature is attained solely by the use of aluminothermically produced steel which comprises forming a melt of the steel in a re-usable casting crucible, tapping the crucible and pouring the steel as a metallurgically balanced melt into a casting mold surrounding the rail ends in a manner such that the steel flows into the mold only on both sides of the upper curvatures of the rail heads, laterally and downwardly past the lower edges of the rail heads, angularly towards the rail webs, and then to the rail bases, the initial portion of the steel passing the rail bases, and then filling the mold with steel.

2. A method according to claim 1 in which the air in the mold above the rail heads is exhausted to the atmosphere through ventilating ducts.

3. A casting mold for use in the aluminothermic welding of rail ends which comprises a separable two piece mold housing adapted to receive the rail ends therein, a gate in each half of the mold housing having a configuration such that molten metal poured into the mold flows downwardly past the rail heads, angularly towards the rail webs, and then to the rail bases, risers extending upwardly from the mold cavity above the outer edges of the rail bases, and ventilating ducts in the side walls of the mold extending from a point above the rail heads to the exterior of the mold.

4. A casting mold for use in the aluminothermic welding of rail ends which comprises a separable two piece mold housing adapted to receive the rail ends therein, a gate in each half of the mold housing having a configuration such that molten metal poured into the mold flows downwardly past the rail heads, angularly towards the rail webs, and then to the rail bases, removable bar means positioned above the rail ends and forming one side of the upper portions of each of the gates, risers extending upwardly from the mold cavity above the outer edges of the rail bases, and ventilating ducts in the side walls of the mold extending from a point above the rail heads to the exterior of the mold.

References Cited by the Examiner

UNITED STATES PATENTS

| | | | |
|---|---|---|---|
| 1,741,399 | 12/29 | Begtrup | 22—116 |
| 1,947,966 | 2/34 | Begtrup | 22—116 |
| 2,932,863 | 4/60 | Ahlert | 22—116 |
| 3,007,217 | 11/61 | Ahlert | 22—116 |
| 3,091,825 | 6/63 | Deppeler et al. | 22—116 |

MICHAEL V. BRINDISI, *Primary Examiner.*

MARCUS U. LYONS, *Examiner.*